(12) United States Patent
Prevey, III (10) Patent No.: US 8,511,130 B2
(45) Date of Patent: Aug. 20, 2013

(54) METHOD FOR PREVENTING OR ARRESTING CRACK DEVELOPMENT AND PROPAGATION

(75) Inventor: Paul S. Prevey, III, Cincinnati, OH (US)

(73) Assignee: Surface Technology Holdings, Ltd., Cincinnati, OH (US)

( * ) Notice: Subject to any disclaimer, the term of this patent is extended or adjusted under 35 U.S.C. 154(b) by 285 days.

(21) Appl. No.: 12/925,743

(22) Filed: Oct. 28, 2010

(65) Prior Publication Data
US 2011/0079070 A1 Apr. 7, 2011

Related U.S. Application Data

(62) Division of application No. 11/709,621, filed on Feb. 22, 2007, now abandoned.

(60) Provisional application No. 60/777,019, filed on Feb. 27, 2006.

(51) Int. Cl.
| | | |
|---|---|---|
| *B21D 31/00* | (2006.01) | |
| *B21D 17/04* | (2006.01) | |
| *B21D 1/02* | (2006.01) | |
| *B21D 3/02* | (2006.01) | |
| *B21C 37/30* | (2006.01) | |
| *B24B 39/00* | (2006.01) | |

(52) U.S. Cl.
USPC .............. 72/377; 72/75; 72/112; 29/90.01; 29/90.5

(58) Field of Classification Search
USPC ............ 72/112, 377, 75, 53, 67, 412, 446, 72/447; 29/90.01, 90.5
See application file for complete search history.

(56) References Cited

U.S. PATENT DOCUMENTS

| | | | |
|---|---|---|---|
| 2,438,837 A | 3/1948 | Archer et al. | |
| 3,110,086 A | 11/1963 | Phillips | |
| 3,110,986 A | 11/1963 | Phillips | |
| 3,270,410 A | 9/1966 | Salter et al. | |
| 3,434,327 A | 3/1969 | Speakman | |
| 3,625,568 A | 12/1971 | Verdler | |
| 3,958,389 A * | 5/1976 | Whiteside et al. | 403/279 |
| 4,423,619 A | 1/1984 | Champoux | |
| 4,425,780 A | 1/1984 | Champoux | |
| 4,471,643 A | 9/1984 | Champoux et al. | |
| 4,557,033 A | 12/1985 | Champoux | |

(Continued)

OTHER PUBLICATIONS

European Patent Office, Sup. Eur. Search Rpt., Mar. 18, 2010. search made at The Hague fpr cprresponding app. No. 07771262.8 (PCT/US07/004761).

(Continued)

*Primary Examiner* — Dana Ross
*Assistant Examiner* — Mohammad I Yusuf
(74) *Attorney, Agent, or Firm* — Mark F. Smith; Smith Brandenburg Ltd.

(57) ABSTRACT

A method for preventing or arresting the development and propagation of cracks in the material surrounding a fastener. The method includes introducing compressive residual stresses in the material surrounding the fastener. The compressive residual stresses offset the high residual tensile and applied stresses which the material may be subjected to in operation and thereby prevent or arrest the development of cracks. Using the output of a sensor, the surface treatment apparatus is positioned relative to a fastener. A compression tool is impinged against the surface of the material adjacent to the fastener and rotated around the perimeter of the fastener thereby inducing a zone of compressive residual stress.

16 Claims, 5 Drawing Sheets

(56) References Cited

U.S. PATENT DOCUMENTS

| | | |
|---|---|---|
| 4,771,627 A | 9/1988 | Speakman |
| 5,127,254 A | 7/1992 | Copple et al. |
| 5,218,854 A | 6/1993 | Janzebowicz et al. |
| 5,305,627 A | 4/1994 | Quincey et al. |
| 5,433,100 A | 7/1995 | Easterbrook et al. |
| 5,531,570 A * | 7/1996 | Mannava et al. ......... 416/241 R |
| 5,577,633 A * | 11/1996 | Jones ................................ 221/1 |
| 5,826,453 A | 10/1998 | Prevey, III |
| 6,230,537 B1 | 5/2001 | Easterbrook |
| 6,288,358 B1 * | 9/2001 | Dulaney et al. ............ 219/121.6 |
| 6,301,766 B1 * | 10/2001 | Kolle .......................... 29/421.2 |
| 6,389,865 B1 | 5/2002 | Easterbrook |
| 6,615,636 B2 | 9/2003 | Easterbrook |
| 6,711,928 B1 | 3/2004 | Easterbrook |
| 6,712,315 B2 | 3/2004 | Schmidt et al. |
| 6,742,376 B2 | 6/2004 | Easterbrook et al. |
| 7,188,398 B2 * | 3/2007 | Prevey ........................... 29/90.5 |
| 7,409,756 B2 * | 8/2008 | Sirilutporn et al. ........ 29/407.01 |
| 2001/0052254 A1 | 12/2001 | Easterbrook et al. |

OTHER PUBLICATIONS

USPTO Office Action dated Dec. 17, 2009, parent U.S. Appl. No. 11/709,621, filed Feb. 22, 2007.

USPTO Office Action dated Jun. 23, 2010, parent U.S. Appl. No. 11/709,621, filed Feb. 22, 2007.

* cited by examiner

METHOD FOR PREVENTING OR ARRESTING CRACK DEVELOPMENT AND PROPAGATION

This application is a divisional patent application of U.S. patent application Ser. No. 11/709,621 filed Feb. 22, 2007 now abandoned which claims the benefit of U.S. provisional application for patent 60/777,019 filed Feb. 27, 2006.

BACKGROUND OF THE INVENTION

This invention relates to a method for preventing or arresting the development and propagation of fatigue cracks in the material surrounding a fastener without removing and reinserting the fastener. The invention is particularly applicable to metallic materials where stress related failures, such as fatigue and stress corrosion cracking (scc), are a primary concern. Such materials would include, though not exclusively, those materials used in aerospace applications where stress related failures have potentially catastrophic consequences.

Interruptions or discontinuities, such as fastener holes, in an otherwise continuous material serve as stress risers when the material is placed under load. This means that the material immediately surrounding the discontinuity experiences greater stress than the balance of the material even though the applied load may be uniform over the entire part. The material surrounding these discontinuities is, therefore, more susceptible to crack initiation and ultimately failure. This effect is especially pronounced when the component undergoes cyclical loading and unloading as the part ultimately fails due to fatigue. Failures may also occur as a result of stress corrosion cracking in such areas when the component is exposed to corrosive environments such as salt water. Cracks may also initiate from flaws in the material such as corrosion pits, fretting damage and similar flaws.

Materials used in aircraft applications are especially susceptible to such failures, particularly in airframe structural members and aircraft skin materials. More specifically, fatigue cracks often develop in the material surrounding the multitude of fastener holes in the fuselage of an aircraft. As the fuselage is placed under load, such as when the fuselage is pressurized during operation of the aircraft, the material surrounding these holes experiences a greater amount of stress than material elsewhere in the structure. Over many cycles of loading and unloading such high stresses contribute to the fatigue failure of the part from cracks initiating in the material surrounding the hole. The development of such cracks may have potentially catastrophic effects. The possibility of such failures is ever increasing as aircraft in commercial and military fleets age.

Prior attempts to solve this problem involve inducing compressive residual stresses in the material surrounding the fastener hole. A variety of techniques for inducing compressive residual stresses have been previously used including stress coining, indenting, split-sleeve cold expansion, split mandrel cold working, and ballizing. U.S. Pat. No. 6,711,928 —Easterbrook (patented Mar. 30, 2004)—includes an overview of these various methods for improving the fatigue performance of a hole or slot. While these techniques are well suited for forming a pre-stressed hole or slot in which a fastener may be inserted, they are not well suited for the in situ treatment of the material surrounding fasteners as they would first require the removal of the fastener. For structures such as an aircraft fuselage skin, this would require the removal and replacement of thousands of fasteners which would be extremely laborious, time consuming and expensive. Therefore, such methodologies are not well suited for the repair of existing structures.

Further, the residual stress distribution introduced by stress coining and indenting cannot be precisely controlled to maximize the benefit of the induced compressive residual stress distribution. Also, the coining and indenting processes treat the entire area surrounding the fastener hole in a single operation. This requires a great deal of force to obtain the desired compressive residual stresses. The application of such extreme forces could potentially damage the structure or skin of the aircraft.

Therefore, the need exists for a cost effective and efficient means of introducing residual compressive stresses in the material surrounding a fastener hole or slot without removing the fastener to prevent or arrest the development and propagation of cracks.

SUMMARY OF THE INVENTION

The present invention satisfies the need for a cost effective and efficient means of introducing residual compressive stresses in the material surrounding a fastener hole or slot without removing the fastener to prevent or arrest the development and propagation of cracks. The method and apparatus for preventing or arresting crack development and propagation of the present invention involves introducing residual compressive stresses in the material adjacent to a fastener in a controlled manner such that the resistance of the material to stress induced failure mechanisms is improved.

In one embodiment of the present invention, compressive residual stresses are introduced around a fastener in situ, without removing the fastener before treatment.

In another embodiment of the present invention, compressive residual stresses are introduced around a fastener to prevent the development of cracks in the material surrounding the fastener.

In another embodiment of the present invention, compressive residual stresses are introduced around a fastener to arrest the propagation of existing cracks in the material surrounding the fastener.

In another embodiment of the present invention, a surface treatment apparatus is used to impart compressive residual stresses around a fastener by burnishing, deep rolling, impact peening, indenting, or laser shocking.

In another embodiment of the present invention, a surface treatment apparatus is used in conjunction with sensors to locate individual fasteners and introduce compressive residual stresses around the fastener.

BRIEF DESCRIPTION OF THE DRAWINGS

These and other features, aspects, advantages and embodiments of the present invention will become better understood with regard to the following description, appended claims, and accompanying drawings where:

DETAILED DESCRIPTION OF THE INVENTION

Figure 1:
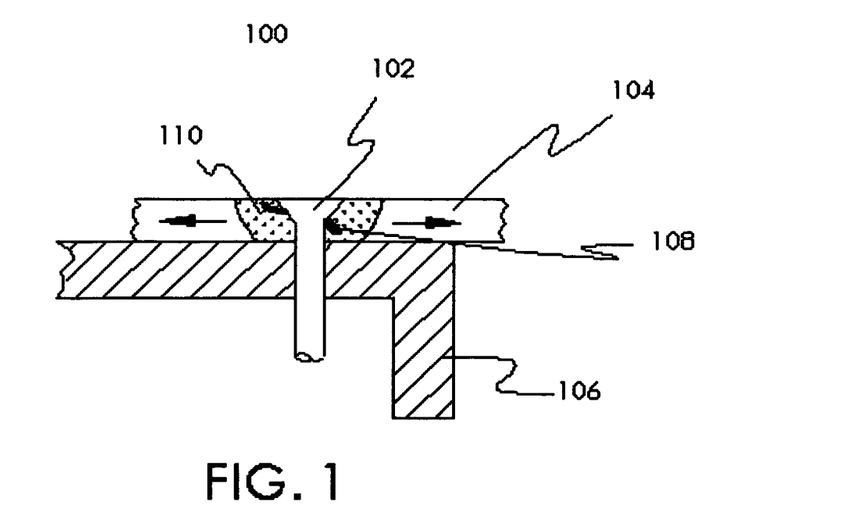
FIG. 1 is a cross sectional illustration of an aircraft skin material joined to a stringer with a fastener.

The method and apparatus of the present invention utilize the introduction of compressive residual stresses to prevent or arrest the development and propagation of cracks in the material directly adjacent to a fastener in a metallic material. The method and apparatus are particularly well suited to treat the area surrounding fasteners on the skin material of an aircraft fuselage where fatigue cracks are known to develop. Referring to FIG. 1, a cross-sectional view is shown of the point of attachment 100 of a metal skin sheet 104 to a structural member or stringer 106. The skin sheet 104 is attached to the stringer 106 by a fastener 102 that passes through a hole in the skin sheet and is secured in the stringer 106. The fastener 102 may be a screw, rivet, bolt, pin, or other similar interference fit connector or fastener. The fastener 102 may also be a spot weld.

Prior to the introduction of compressive residual stresses, the hole in the sheet material acts as a stress riser, effectively amplifying the tensile stresses experienced by the skin sheet during cyclic loading. The amplifying effect of the stress riser places the region 110 surrounding the fastener in a state of tension (indicated by the "+" in FIG. 1). This tension makes the region 110 prone to the development of fatigue cracks 108. Further cyclic loading causes the fatigue cracks 108 to propagate and grow, eventually culminating in the complete failure of the material.

Figure 2:
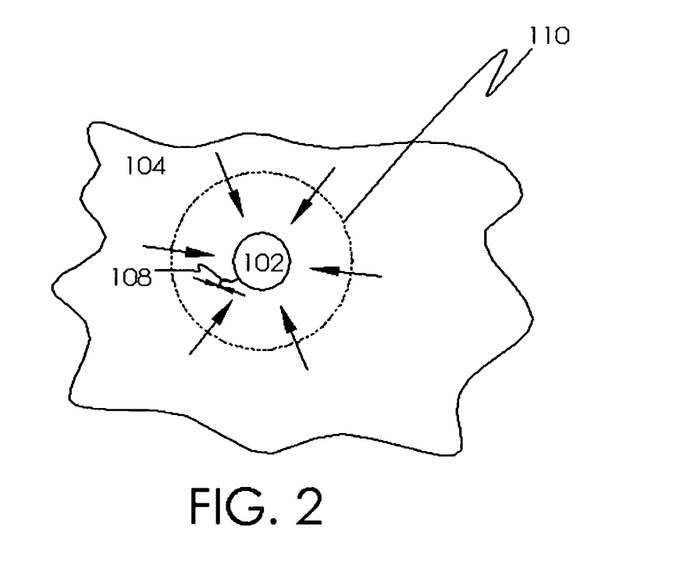
FIG. 2 shows a region of compressive residual stress introduced around a fastener to arrest and prevent cracking.

Referring now to FIG. 2, the method for preventing or arresting crack development and propagation is carried out by introducing a deep layer of compressive residual stresses in the surface of the skin sheet 104 in the region 110 immediately adjacent to the fastener 102. The deep layer of compressive residual stress may extend substantially through the thickness of the skin sheet 104. The introduction of the compressive residual stress is accomplished by burnishing, deep rolling, shot peening, controlled impact peening, laser shocking or any other means capable of the in situ introduction of compressive residual stresses in the skin sheet without removing the fastener 102. The introduction of compressive residual stresses has the effect of "squeezing" or compressing the material in the region 110 around the fastener inward, towards the fastener 102. This "squeezing" effect produces both "hoop" or circumferential compression and radial compression that mitigates the development of new cracks and arrests the growth and propagation of existing cracks 108 as the tensile stresses causing the formation and propagation of these cracks are offset by the induced compressive residual stresses. The shape and size of the region 110 in which compressive residual stresses are induced may be determined by operational experience, mathematical modeling, or a combination thereof.

Figure 3:
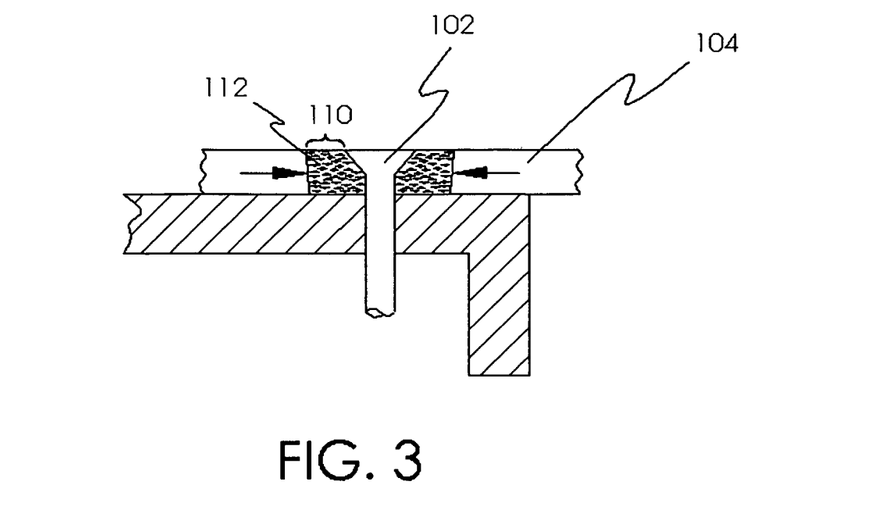
FIG. 3 is a cross sectional illustration showing the deep layer of compressive residual stress introduced around a fastener.

As shown in FIG. 3, the deep layer of compressive residual stress 112 (shaded portion) extends into the surface of the skin sheet 104 in the region 110 immediately adjacent to the fastener 102. The deep layer of compressive residual stress 112 extends to a predetermined depth that is known through operational experience and/or mathematical modeling to arrest or mitigate the development of cracks. This depth may substantially extend through the entire thickness of the skin sheet 104.

Figure 4:
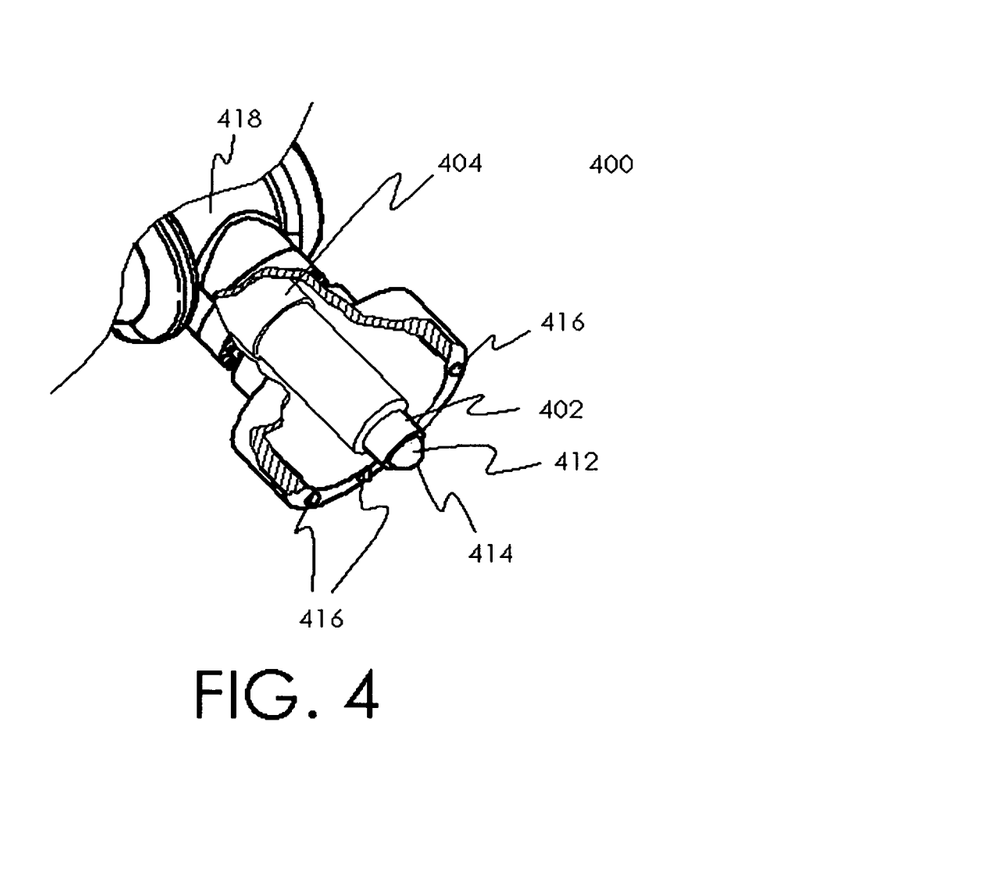
FIG. 4 is a perspective view illustrating a surface treatment apparatus according to one embodiment of the present invention.

Referring to FIG. 4, one embodiment of the surface treatment apparatus 400 consists of a compression tool 402 for inducing compressive residual stress removably positioned on a tool holder 404. The compression tool can be selected from the list including, but not limited to, burnishing tools, deep rolling tools, impact peening tools, laser shocking tools and indenting tools. Preferably, the compression tool 402 is a burnishing tool having a burnishing ball 412, the forward most tip 414 of which contacts the surface being treated in a rolling motion to induce compressive residual stress.

Figure 5:
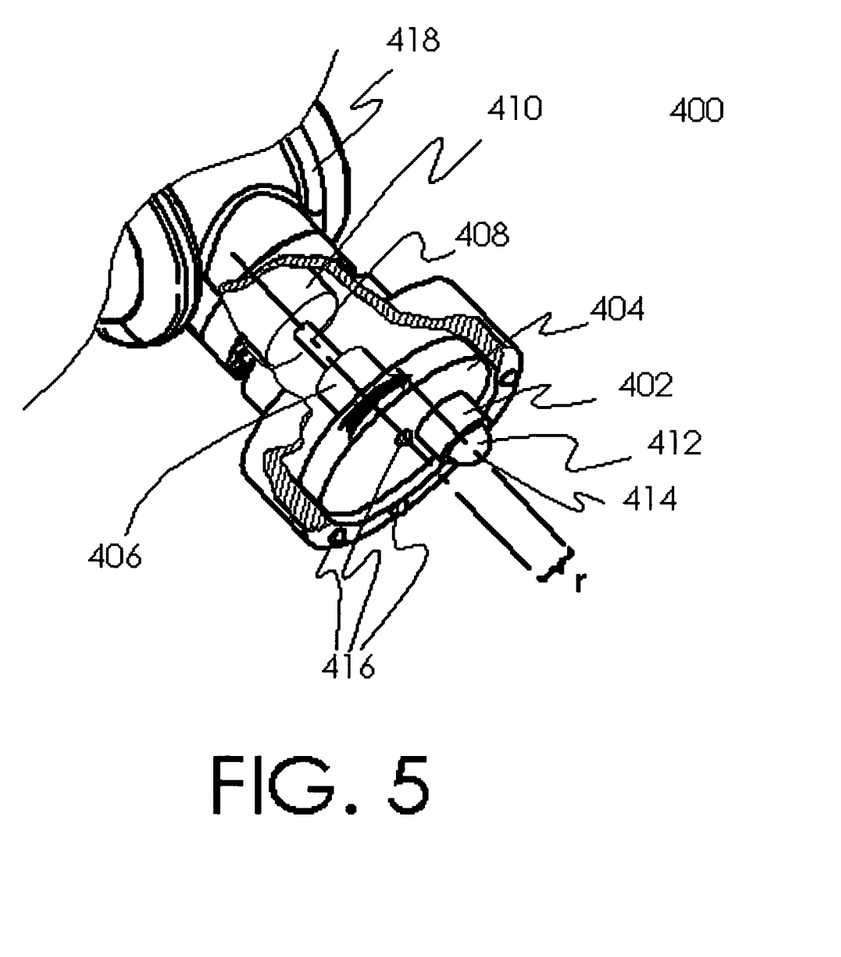
FIG. 5 is a perspective view illustrating a surface treatment apparatus according to another embodiment of the present invention.
Figure 6:
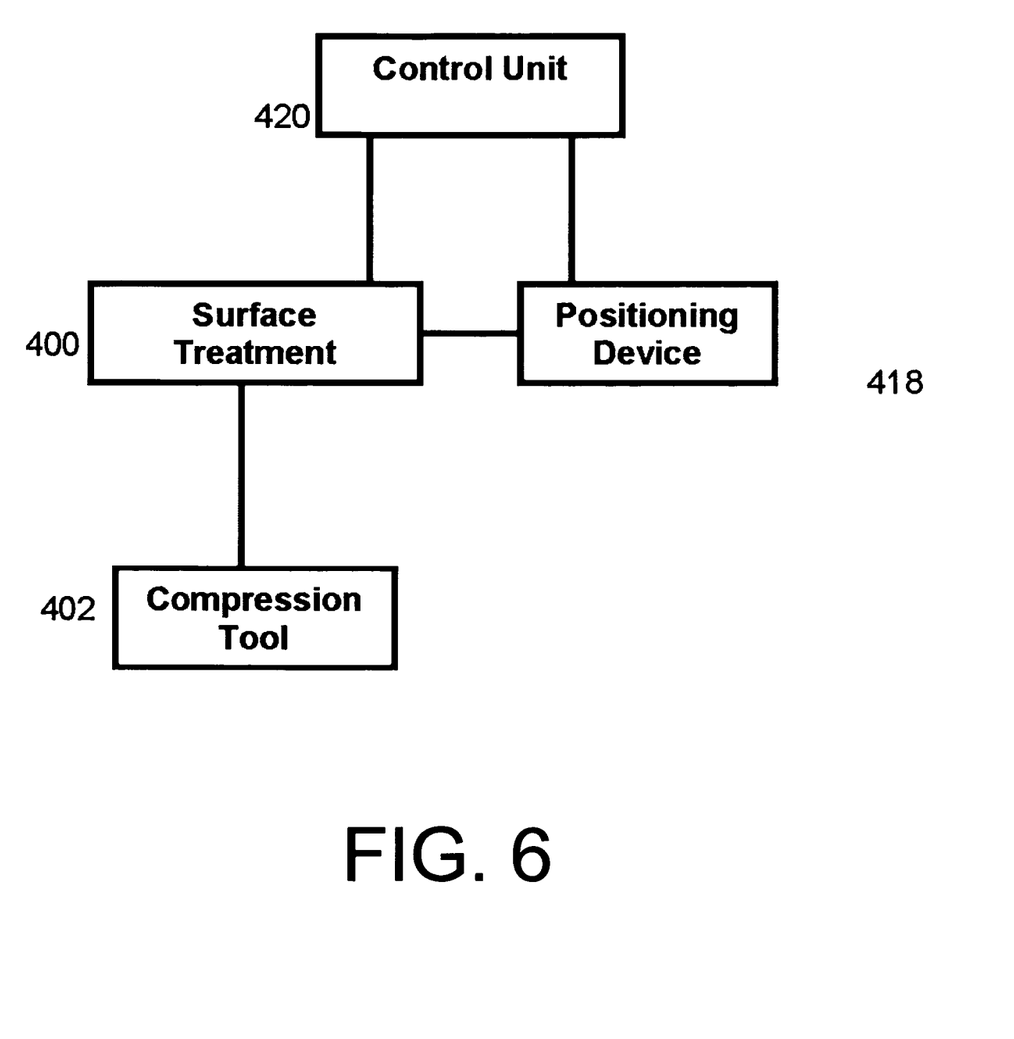
FIG. 6 is a schematic illustrating a surface treatment apparatus for implementing the method of preventing or arresting crack development and propagation around a fastener, according to one embodiment of the present invention.

In another embodiment of the present invention shown in FIG. 5, the tool holder 404 is fixedly attached to a shaft 406. The shaft 406 is connected to the armature 408 of a rotary actuator 410 that provides rotational motion to the shaft 406 and tool holder 404. The compression tool 402 is positioned radially on the tool holder 404 such that, as the tool holder 404 and compression tool 402 rotate, the path of the compression tool 402 defines a circle of radius r whose center point is concentric with the axis of rotation of the shaft 406. The size of the described circle is increased or decreased by adjusting the position of compression tool 402 with respect to the axis of rotation of the shaft 406. As schematically illustrated in FIG. 6, the surface treatment apparatus 400 is preferably mounted to a conventional positioning device 418, such as a robotic arm or milling machine (not shown).

The surface treatment apparatus 400 of the present invention can be manually or automatically operated. As schematically illustrated in FIG. 6, the surface treatment apparatus 400 can include a control unit 420 for controlling the positioning device 418 and the rotation of the compression tool 402 as well as the force applied by the compression tool 402 to the surface being treated. The control unit 420 can include a microprocessor, such as a computer operating under computer software control.

In one embodiment, the surface treatment apparatus 400 of the present invention may also include belt and/or gear drive assemblies (not shown) attached to the tool holder 404 and powered by servomotors (not shown) as is known in the art. The servomotors can be in operable communication with the control unit 420 to facilitate the positioning of the compression tool 402 with respect to the axis of rotation of the shaft 406 during operation of the surface treatment apparatus 400. Similarly, belt and/or gear drive assemblies (not shown) and servomotors (not shown) may be used in conjunction with the positioning device 418 and control unit 420 to facilitate computer control in the positioning of the surface treatment apparatus 400. Shaft encoders in the servo systems, stepper motor drives, linear variable differential transformers, or resistive or optical positioning sensors can be used in conjunction with the drive assemblies and servomotors to facilitate precise control and reproducibility in positioning the surface treatment apparatus 400.

The surface treatment apparatus 400 of the present invention may also include one or more sensors 416 for detecting the presence and position of fasteners on the surface being treated. The sensors 416, disposed proximate to the tip 414 portion of the compression tool 402, may be selected from the list including, but not limited to, optical sensors, magnetic sensors, electromagnetic sensors, tactile sensors, inductive sensors, resistive sensors, and capacitive sensors. The sensors 416, which are in electrical communication with the control unit 420, detect the location of each individual fastener. The control unit 420 can utilize the output of the sensors 416 to accurately position the surface treatment apparatus 400 with respect to each fastener treated as well as record the location of each treatment operation to prevent multiple treatments on the same fastener.

Further, one or more sensors (not shown), including, but not limited to, linear variable differential transformers or laser, capacitive, inductive, or ultrasonic displacement sensors, which are in electrical communication with the control unit 420, can be used to measure the spacing of the compression tool 402 above the surface being treated and, thus, the motion of the compression tool 402. Similarly, shaft encoders in servo systems, stepper motor drives, linear variable differential transformers, or resistive or optical positioning sensors can be used to determine the position of the surface treatment apparatus 400 along the surface being treated. One or more pressure sensors (not shown) including, but not limited to, load cells incorporating resistive, piezo electric, or capacitive elements, which are in communication with the control unit 420, can be used to measure the amount of force applied by the compression tool 402 to the material surrounding a fastener. The measurements obtained by the motion and pressure sensors are communicated to the control unit 420 that compares the measurements to preprogrammed parameters and, if necessary, instructs the positioning device 416 to make corrections or adjustments to the direction of motion, speed of rotation, and/or force being applied by the surface treatment apparatus 400.

Figure 7:
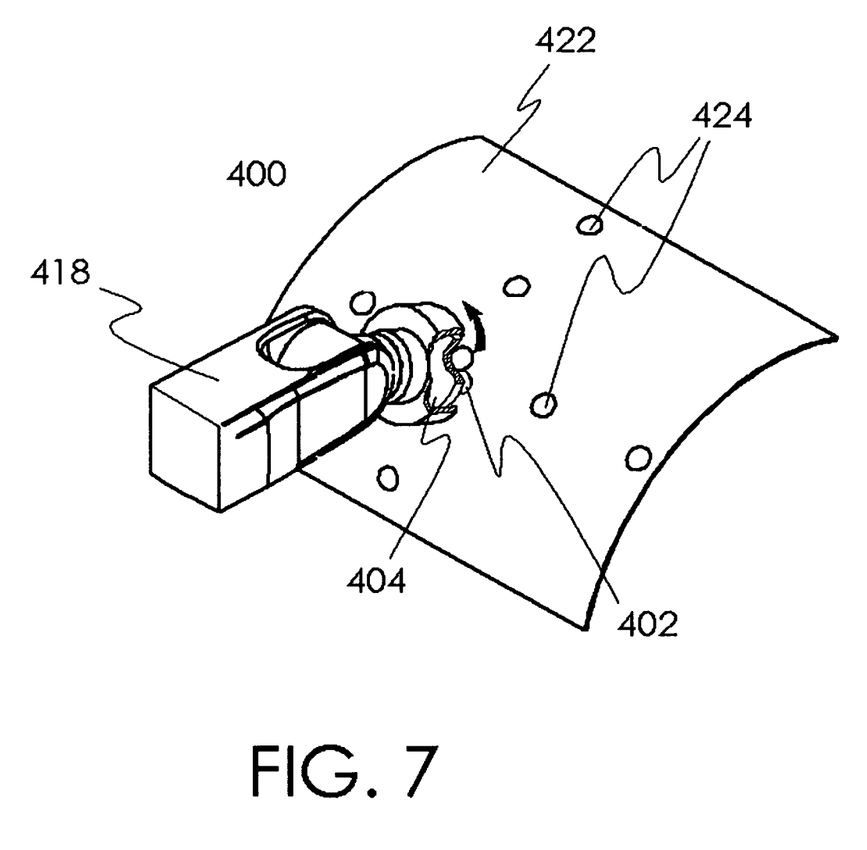
FIG. 7 is a perspective view illustrating a surface treatment apparatus according to one embodiment of the present invention being used to treat fasteners in the skin material of an aircraft fuselage.

FIG. 7 shows the surface treatment apparatus 400 being used to treat fasteners 424, in this case rivets, contained along the fuselage 422 of an aircraft. The surface treatment apparatus 400 is first positioned relative to the fuselage 422. Sensors (not shown) relay a signal to the control unit (not shown) that indicates the position of the surface enhancement apparatus 400 relative to the surface of the fuselage 422 as well as the position of the fasteners 424. Utilizing this information, the control unit positions the surface treatment apparatus 400 relative to a fastener 424. The compression tool 402 is then impinged against the material adjacent the fastener 424 and rotated around the fastener 424 thereby inducing compressive residual stress to mitigate or arrest cracking around the fastener 424. The location of the fastener 424 and treatment operation is recorded by the control unit and the surface treatment apparatus 400 is repositioned to treat another fastener 424.

In one embodiment of the invention, the surface treatment apparatus is manually controlled by an operator interfacing with the control unit. The operator positions the surface treatment apparatus relative to the surface and fastener to be treated. The sensors and control unit assist the operator in positioning the surface treatment apparatus by providing audible or visual confirmation of proper positioning. The compression tool is then impinged against the surface of the workpiece and rotated around the fastener thereby introducing compressive residual stress.

In another embodiment of the invention, where fasteners are regularly spaced, the surface treatment apparatus is programmed to follow a specific path and treat each fastener at the specified interval. Sensors are used to position the surface treatment apparatus with respect to each fastener. The location of each fastener treated, as well as the surface treatment parameters used and the pressures applied, are recorded by the control unit.

In another embodiment of the invention, where fasteners are irregularly spaced along a given path, the control unit is programmed to move the surface treatment apparatus along a pre-determined path or row of fasteners. Sensors are used to locate each fastener along the programmed path. The surface treatment apparatus utilizes the output of the sensors to record the location of each fastener, position the device, and determine appropriate surface treatment parameters, such as the angle of rotation, and the force with which the compression tool is impinged against the surface being treated, to avoid overlap between adjacent treatment areas.

As described and shown herein, the method apparatus for preventing and arresting the development and propagation of cracks around fasteners offers significant advantages over other methods of "pre-stressing" fastener holes and slots as it enables the material surrounding a fastener to be treated without having to remove and replace the fastener. This significantly reduces the labor associated with treating the material surrounding fasteners post-manufacture, such as treating the multitude of fasteners along the fuselage of a serviced aircraft. Further, the use of the compression tool in conjunction with sensors for detecting a fastener and positioning the surface treatment apparatus significantly decreases the amount of manual labor required to perform the process.

While the method and apparatus described herein constitutes a preferred embodiment of the invention, it is to be understood that the invention is not limited to the precise method and that changes may be made therein without departing from the scope of the invention.

What is claimed is:

1. A method for preventing or arresting crack development and propagation in material surrounding a fastener installed along and extending through the surface of a structure or article, the method comprising the steps of:
   locating a position of a fastener fully installed in the surface of the structure;
   positioning an apparatus for inducing residual compressive stress relative to the fastener; and
   rotating the apparatus around the fastener to induce compressive residual stress in at least a portion of the material circumscribing a portion of the fastener such that said compressive residual stress extends circumferentially around the fastener from the surface to a predetermined depth and further compresses the material inwardly towards the fastener.

2. The method of claim 1 wherein the step of locating the position of the fastener comprises the use of sensors for detecting the position of the fastener.

3. The method of claim 2 wherein the sensors used for detecting the position of the fastener are selected from the list consisting of optical sensors, magnetic sensors, electromagnetic sensors, tactile sensors, inductive sensors, resistive sensors, and capacitive sensors.

4. The method of claim 1 wherein the step of inducing compressive residual stress is accomplished by burnishing, deep rolling, controlled impact peening, shot peening, or laser shocking.

5. The method of claim 1 wherein the step of positioning the apparatus for inducing compressive residual stress is done manually.

6. The method of claim 1 wherein the steps of locating, positioning and inducing are performed under computer control.

7. A method for inducing compressive residual stress in a surface of a workpiece surrounding a portion of a fastener that is installed in a structure or article to prevent or arrest crack development and propagation, the method comprising the steps of:
   locating a fastener and positioning an apparatus in position relative to the fastener;

using an apparatus having a rotational actuator and a tool holder for receiving and positioning attachments relative to an axis of rotation of the tool holder; and using a compression tool adjustably positioned on the tool holder such that the compression tool impinges and is rotated around the surface surrounding a portion of the fastener to induce residual compressive stress in the surface such that the compressive residual stress extends circumferentially around the fastener from the surface to a predetermined depth and further compresses the material inwardly towards the fastener.

8. The method of claim 7 further comprising the step of using at least one sensor for locating the fastener on the workpiece.

9. The method of claim 7 further comprising the step of using a positioning device for positioning the apparatus relative to the workpiece.

10. The method of claim 9 wherein the positioning device is a robotic arm or machine tool.

11. The method of claim 7 wherein the apparatus includes a control unit operatively connected to the compression tool for controlling the induction of compressive residual stress in the surface of a workpiece.

12. A method for inducing compressive residual stress in the material surrounding a portion of a fastener installed in a structure or article to prevent or arrest crack development and propagation, the method comprising the steps of:

rotating at least one compression tool circumferentially around a portion of the fastener to induce compressive residual stress in the material surrounding the fastener such that the compressive residual stress extends circumferentially around the fastener from the surface to a predetermined depth and such that the material surrounding the portion of the fastener is compressed inwardly towards the fastener;

using a positioning device to position the compression tool relative to the fastener; and using at least one sensor for locating the fastener, the at least one sensor operatively connected to the compression tool.

13. The method of claim 12 wherein the at least one sensor comprises a plurality of sensors.

14. The method of claim 12 wherein the at least one sensor is selected from the group consisting of optical sensors, magnetic sensors, electro-magnetic sensors, tactile sensors, inductive sensors, resistive sensors, and capacitive sensors.

15. The method of claim 12 wherein the compression tool is a burnishing tool, deep rolling tool, impact peening tool, laser shock peening tool, or coining tool.

16. The method of claim 12 further comprises the step of using a control unit that is operatively connected to the at least one sensor and the positioning device, the control unit operates to control the positioning of the compression tool with respect to the fastener and the operation of the compression tool.

* * * * *